(12) United States Patent
Yang

(10) Patent No.: US 10,029,352 B2
(45) Date of Patent: Jul. 24, 2018

(54) POLYGONAL WRENCH TOOL

(71) Applicant: Hsin-Hung Yang, Taichung (TW)

(72) Inventor: Hsin-Hung Yang, Taichung (TW)

( * ) Notice: Subject to any disclaimer, the term of this patent is extended or adjusted under 35 U.S.C. 154(b) by 1005 days.

(21) Appl. No.: 14/087,101

(22) Filed: Nov. 22, 2013

(65) Prior Publication Data

US 2015/0143965 A1   May 28, 2015

(51) Int. Cl.
| | | |
|---|---|---|
| *B25F 1/00* | (2006.01) | |
| *F16B 7/10* | (2006.01) | |
| *B25G 1/00* | (2006.01) | |
| *B25B 13/06* | (2006.01) | |
| *B25B 15/00* | (2006.01) | |
| *B25G 1/04* | (2006.01) | |
| *F16B 7/14* | (2006.01) | |
| *B25B 13/56* | (2006.01) | |

(52) U.S. Cl.
CPC .............. *B25B 13/06* (2013.01); *B25B 13/56* (2013.01); *B25B 15/005* (2013.01); *B25B 15/008* (2013.01); *B25G 1/043* (2013.01); *F16B 7/14* (2013.01)

(58) Field of Classification Search
CPC ..... B25B 13/06; B25B 13/102; B25B 15/008; B25B 15/005; B25B 1/043; B25B 1/063; F16B 7/10; F16B 7/14
USPC .......... 403/DIG. 6, 109.1, 109.2, 109.3, 377; 81/437
See application file for complete search history.

(56) References Cited

U.S. PATENT DOCUMENTS

| | | | | |
|---|---|---|---|---|
| 2,735,325 A | * | 2/1956 | Rudd, Jr. ................ | B25B 13/10 29/436 |
| 2,893,765 A | * | 7/1959 | Lyon ...................... | B25G 1/043 403/107 |
| 3,336,611 A | * | 8/1967 | Schepp ................. | B25B 21/007 408/202 |
| 4,551,875 A | * | 11/1985 | Getz ..................... | B25B 21/007 7/138 |
| 4,982,632 A | * | 1/1991 | Barmore ................. | B25B 13/06 279/83 |
| 5,160,140 A | * | 11/1992 | Starrett ................. | F41B 15/027 403/109.3 |

(Continued)

FOREIGN PATENT DOCUMENTS

| | | | | |
|---|---|---|---|---|
| FR | 3004976 A1 | * | 10/2014 | ............ B25B 13/06 |
| WO | WO 2011085440 A1 | * | 7/2011 | ............ B23B 51/12 |

*Primary Examiner* — Bryan R Muller
(74) *Attorney, Agent, or Firm* — Alan D. Kamrath; Kamrath IP Lawfirm, P.A.

(57) ABSTRACT

A polygonal wrench tool has a stick body, a mounting tube, a positioning ball and a spring. The stick body has an insertion end, a first positioning trough, a first distance, a second positioning trough, and a second distance. The first distance is defined between a center of the first positioning trough and the insertion end. The second distance is defined between a center of the second positioning trough and the insertion end. The mounting tube is slidably mounted around the stick body and has a ball hole and a third distance defined between a center of the ball hole and a tube end of the mounting tube. The third distance is larger than the first distance and is shorter than the second distance. The positioning ball is accommodated in the ball hole and abuts the engagement portion. The spring presses the positioning ball.

8 Claims, 12 Drawing Sheets

(56) References Cited

U.S. PATENT DOCUMENTS

| | | | | |
|---|---|---|---|---|
| 5,520,075 A * | 5/1996 | Barmore | ................ | B25B 13/06 |
| | | | | 81/437 |
| 5,752,418 A * | 5/1998 | Robins | ................ | B25B 23/0035 |
| | | | | 81/177.2 |
| 6,418,821 B1 * | 7/2002 | Yamakawa | ............. | B25B 13/06 |
| | | | | 81/124.6 |
| 7,188,553 B1 * | 3/2007 | Pryor | ................ | B25B 23/0021 |
| | | | | 81/177.2 |
| 7,677,140 B2 * | 3/2010 | Hull | ................ | B25B 13/461 |
| | | | | 16/429 |
| 8,196,495 B2 * | 6/2012 | Chen | ................ | B25B 13/06 |
| | | | | 81/125 |
| 2007/0186730 A1 * | 8/2007 | Chen | ................ | B25B 13/461 |
| | | | | 81/177.2 |
| 2008/0041193 A1 * | 2/2008 | Baker | ................ | B25B 13/06 |
| | | | | 81/124.6 |
| 2008/0155785 A1 * | 7/2008 | Chen | ................ | B25G 1/043 |
| | | | | 16/429 |
| 2013/0199343 A1 * | 8/2013 | Crewe | ................ | B23B 51/12 |
| | | | | 81/439 |
| 2014/0096654 A1 * | 4/2014 | Cummings | ............ | B25B 13/102 |
| | | | | 81/124.4 |

* cited by examiner

US 10,029,352 B2

POLYGONAL WRENCH TOOL

BACKGROUND OF THE INVENTION

1. Field of the Invention

The present invention relates to a wrench and, more particularly, to a polygonal wrench tool.

2. Description of Related Art

With reference to FIGS. 11 and 12, an Allen wrench 50 is applied for loosening or tightening a bolt. In use, an end of the Allen wrench 50 is inserted in an Allen bolt. Then, the Allen wrench 50 is rotated to loosen or tighten the Allen bolt.

However, the conventional Allen wrench 50 cannot be applied for a hex bolt, but instead, only a sleeve hex-wrench 60 is applicable for a hex bolt, as shown in FIG. 12. Therefore, in response to bolts of different types, wrenches of different types have to be prepared. It is inconvenient for users to use the wrenches.

SUMMARY OF THE INVENTION

The main objective of the present invention is to provide a polygonal wrench tool to resolve the mentioned problem.

The polygonal wrench tool has a stick body, a mounting tube, a positioning ball and a spring.

The stick body is polygonal and has an insertion end, an engagement portion, a first distance and a second distance. The engagement portion is formed in the stick body and has an engagement slit formed in the stick body along a longitudinal direction of the stick body, a first positioning trough formed in the stick body and communicating with the engagement slit, and a second positioning trough formed in the stick body and communicating with the engagement slit. The first distance is defined between a center of the first positioning trough and the insertion end. The second distance is defined between a center of the second positioning trough and the insertion end.

The mounting tube is hollow, is slidably mounted around the stick body, matches the stick body and has a tube end selectively protruding out of the insertion end, a ball hole formed through the mounting tube and communicating with an interior of the mounting tube, and a third distance defined between a center of the ball hole and the tube end. The third distance is larger than the first distance and is shorter than the second distance.

The positioning ball is accommodated in the ball hole and abuts the engagement portion. The spring is mounted around the mounting tube and presses the positioning ball.

Other objectives, advantages and novel features of the present invention will become more apparent from the following detailed description when taken in conjunction with the accompanying drawings.

DETAILED DESCRIPTION OF PREFERRED EMBODIMENTS

Figure 1:
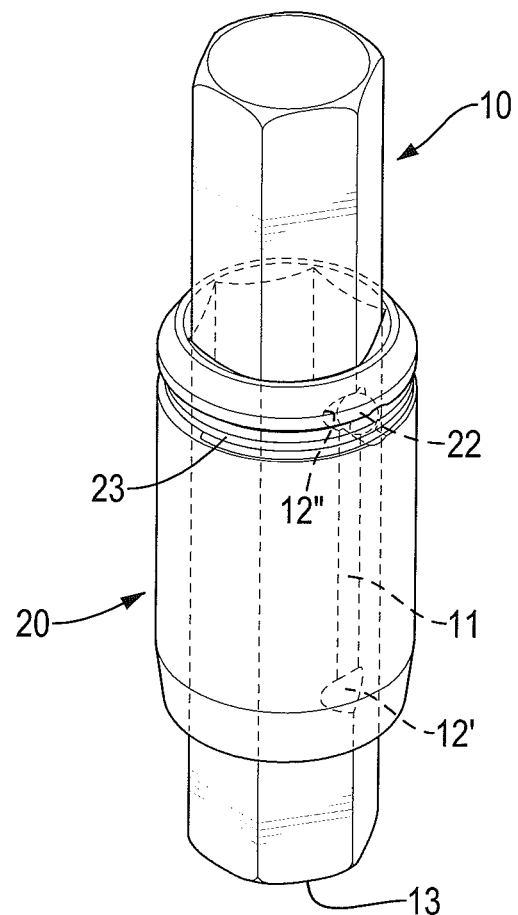
FIG. 1 is a perspective view of a first preferred embodiment of a polygonal wrench tool in accordance with the present invention.
Figure 2:
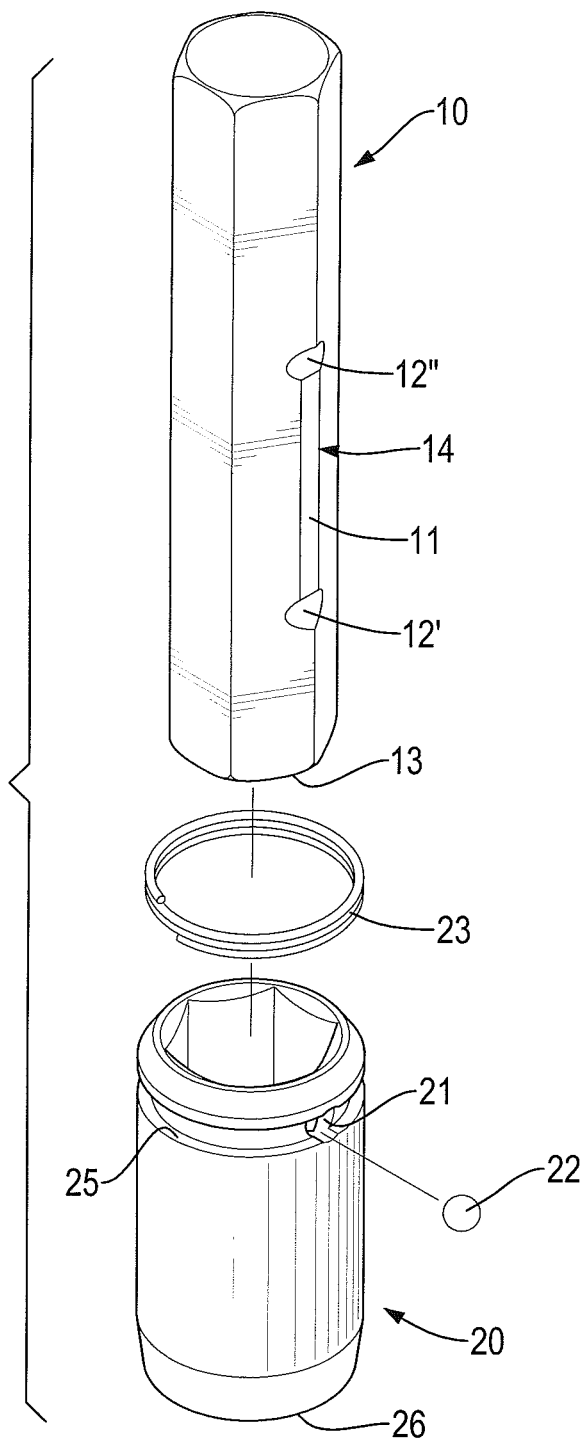
FIG. 2 is an exploded perspective view of the polygonal wrench tool in FIG. 1.

With reference to FIGS. 1 to 3B, a first preferred embodiment of a polygonal wrench tool in accordance with the present invention has an elongated stick body 10, a mounting tube 20, a positioning ball 22 and a spring 23.

A cross section of the stick body 10 may be hexagonal or stellate. In the first preferred embodiment, the cross section of the stick body 10 is hexagonal, such that the stick body 10 has six edges along a longitudinal direction of the stick body 10. The stick body 10 has an insertion end 13, an engagement portion 14, a first distance D1 and a second distance D2. The insertion end 13 is one of two ends of the stick body 10. The engagement portion 14 is formed in the stick body 10 and has an engagement slit 11, a first positioning trough 12' and a second positioning trough 12". The engagement slit 11 is defined in the stick body 10 along the longitudinal direction of the stick body 10. The first positioning trough 12' and the second positioning trough 12" are formed in the stick body 10 at an interval and communicate with the engagement slit 11.

The first positioning trough 12' is closer to the insertion end 13 than the second positioning trough 12" is. Preferably, the first positioning trough 12' and the second positioning trough 12" are located at two ends of the engagement slit 11. Preferably, the first positioning trough 12', the second positioning trough 12" and the engagement slit 11 are formed in one of the edges along the longitudinal direction of the stick body 10. The first distance D1 is defined between a center of the first positioning trough 12' and the insertion end 13. The second distance D2 is defined between a center of the second positioning trough 12" and the insertion end 13. The second distance D2 is longer than the first distance D1.

The mounting tube 20 is hollow, is slidably mounted around the stick body 10, matches the stick body 10, and has a tube end 26, a ball hole 21, a spring trough 25 and a third distance D3. The ball hole 21 is formed radially through the mounting tube 20 and communicates with an interior of the mounting tube 20. The spring trough 25 is defined around the mounting tube 20 and communicates with the ball hole 21. The third distance D3 is defined between a center of the ball hole 21 and the tube end 26. The third distance D3 is longer than the first distance D1 and is shorter than the second distance D2. The positioning ball 22 is accommodated in the ball hole 21 and abuts the engagement portion 14. The spring 23 is mounted in the spring trough 25 and abuts the positioning ball 22 to keep the positioning ball 22 from disengaging from the ball hole 21.

In assembling, the mounting tube 20 is first mounted around the stick body 10, and the ball hole 21 is aligned with the engagement portion 14. Then, the positioning ball 22 is mounted in the ball hole 21 and abuts the engagement portion 14. Specifically, the positioning ball abuts the first positioning trough 12' or the second positioning trough 12". Then, the spring 23 is mounted in the spring trough 25 to abut the positioning ball 22.

Figure 3A:
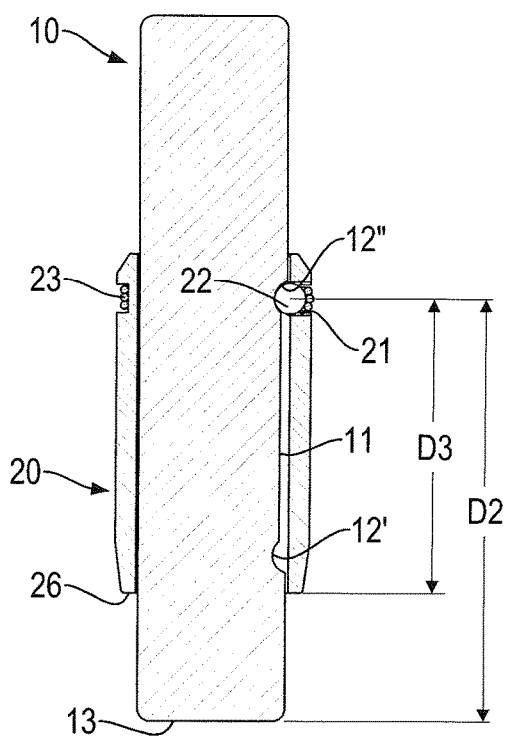
FIG. 3A is a side view in partial section of the polygonal wrench tool in FIG. 1.
Figure 3B:
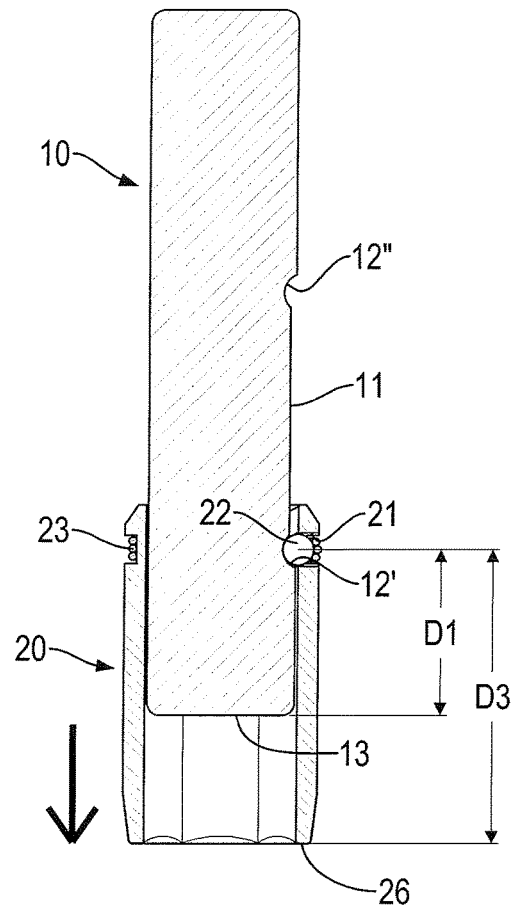
FIG. 3B is an operational side view in partial section of the polygonal wrench tool in FIG. 1.

With reference to FIGS. 3A and 3B, in use, the spring 23 presses the positioning ball 22, such that the positioning ball 22 can be engaged in the first positioning trough 12', the second positioning trough 12" or the engagement slit 11. The positioning ball 22 is slidable in the engagement portion 14, since the spring 23 has a radial elasticity. When the positioning ball 22 is engaged in the second positioning trough 12", the insertion end 13 protrudes out of the mounting tube 20, since the second distance D2 is longer than the third distance D3, as shown in FIG. 3A. Then, the stick body 10 can be applied in an Allen bolt. When the positioning ball 22 is engaged in the first positioning trough 12', the mounting tube 20 protrudes beyond the insertion end 13, since the third distance D3 is longer than the first distance D1, as shown in FIG. 3B. Then, the stick body 10 can be applied around a hex bolt.

Figure 4:
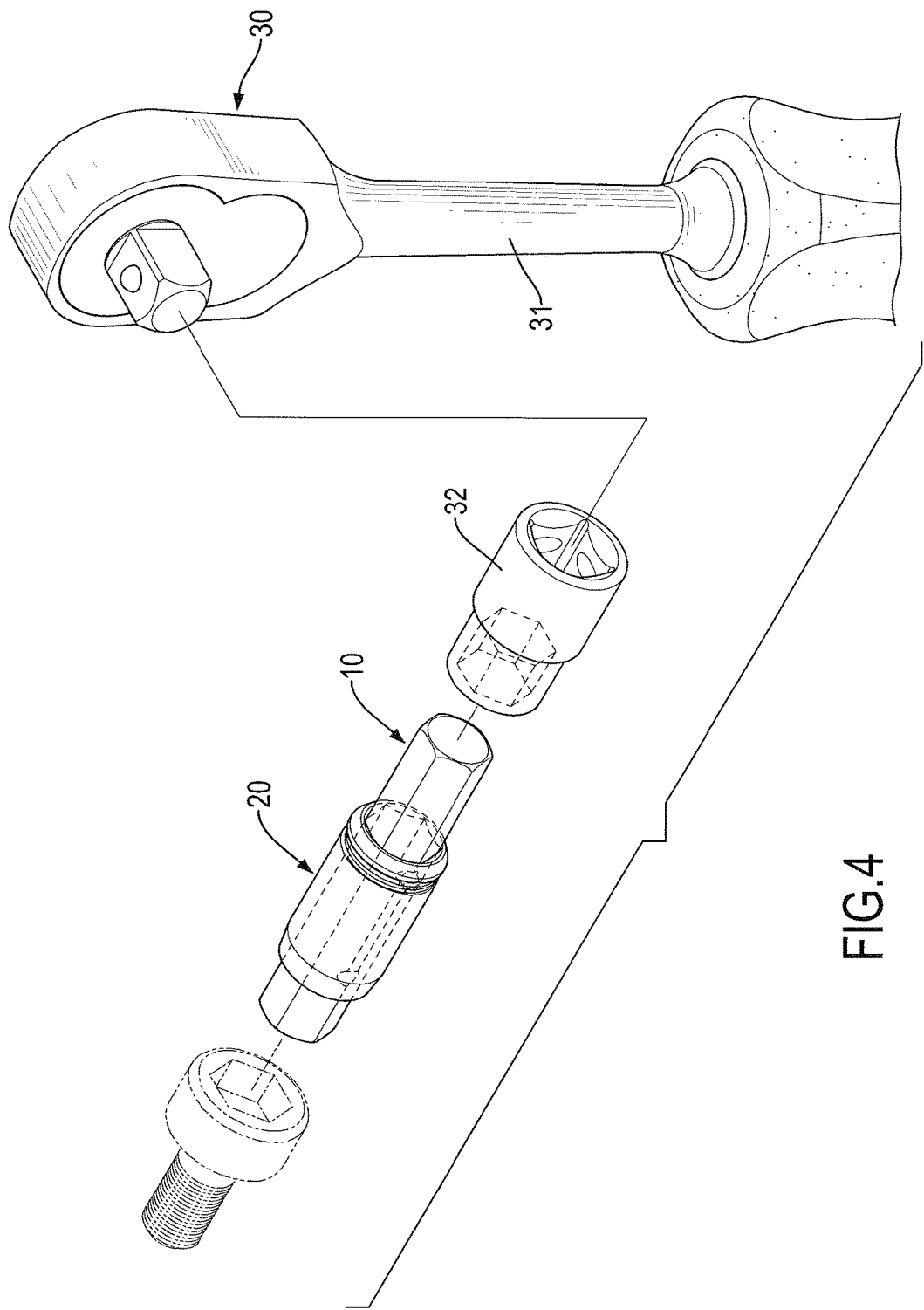
FIG. 4 is an exploded perspective view of a second preferred embodiment of a polygonal wrench tool in accordance with the present invention.
Figure 5:
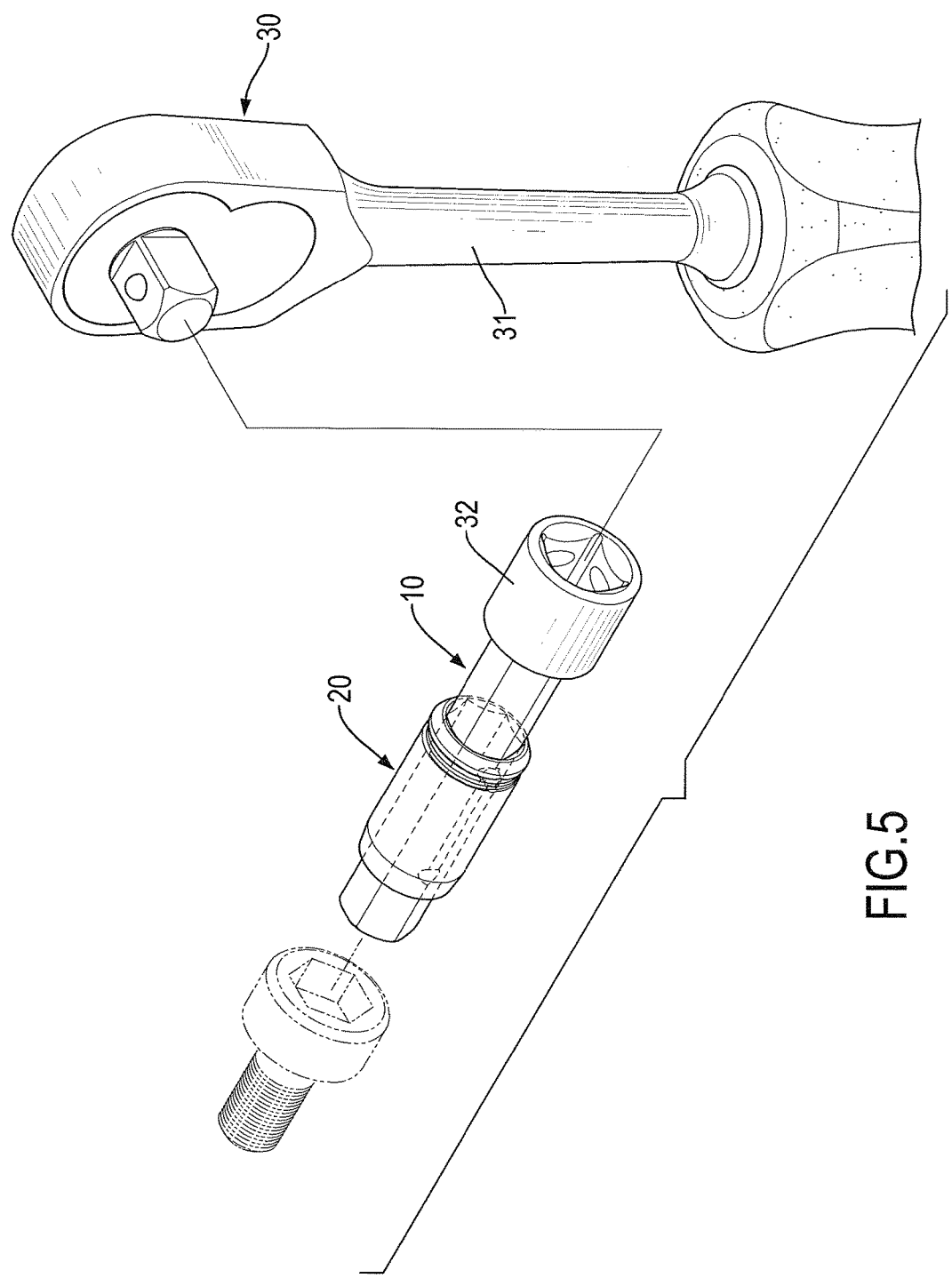
FIG. 5 is another exploded perspective view of the second preferred embodiment of the polygonal wrench tool in accordance with the present invention.

With reference to FIGS. 4 and 5, a second preferred embodiment of a polygonal wrench tool in accordance with the present invention further has a holding handle 30. The holding handle 30 is connected with the stick body 10 and has a handle body 31 and an adapter tube 32. The handle body 31 is elongated. The adapter tube 32 is connected between the handle body 31 and the stick body 10 opposite to the insertion end 13. The adapter tube 32 may be detachably connected with the stick body 10, as shown in FIG. 4. Alternatively, the adapter tube 32 may be undetachably connected with the stick body 10, as shown in FIG. 5.

Figure 6:
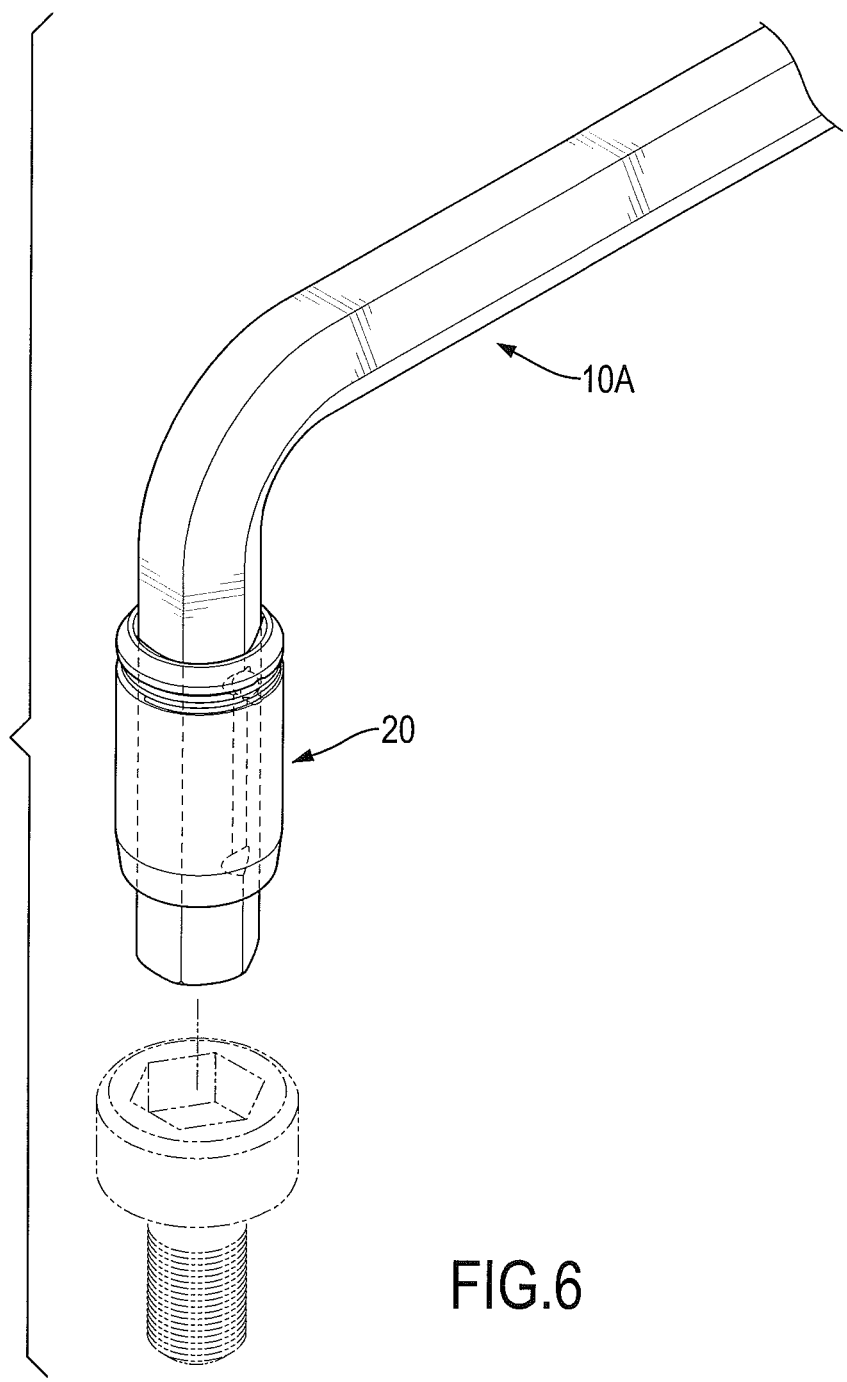
FIG. 6 is an operational perspective view of a third preferred embodiment of a polygonal wrench tool in accordance with the present invention.

With reference to FIG. 6, a third preferred embodiment of a polygonal wrench tool in accordance with the present invention is similar with the first embodiment as shown in FIG. 1. The stick body 10A is elongated and L-shaped.

Figure 7:
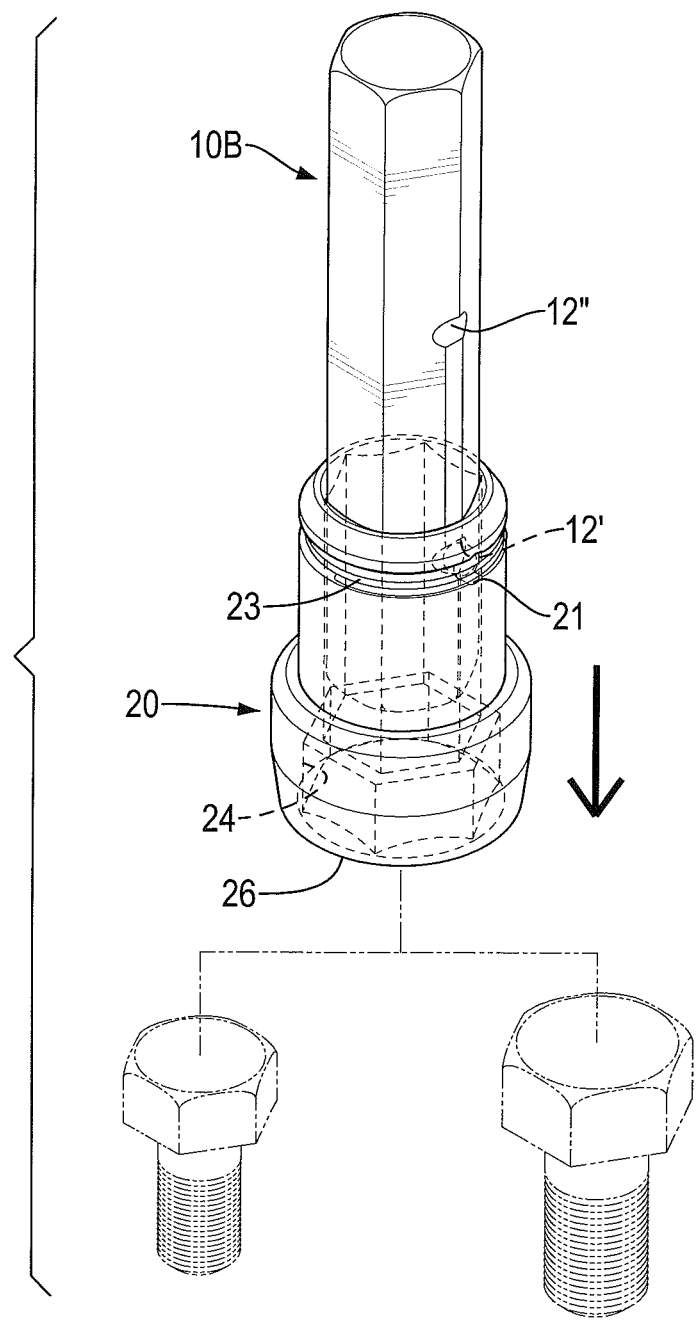
FIG. 7 is an operational perspective view of a fourth preferred embodiment of a polygonal wrench tool in accordance with the present invention.
Figure 8A:
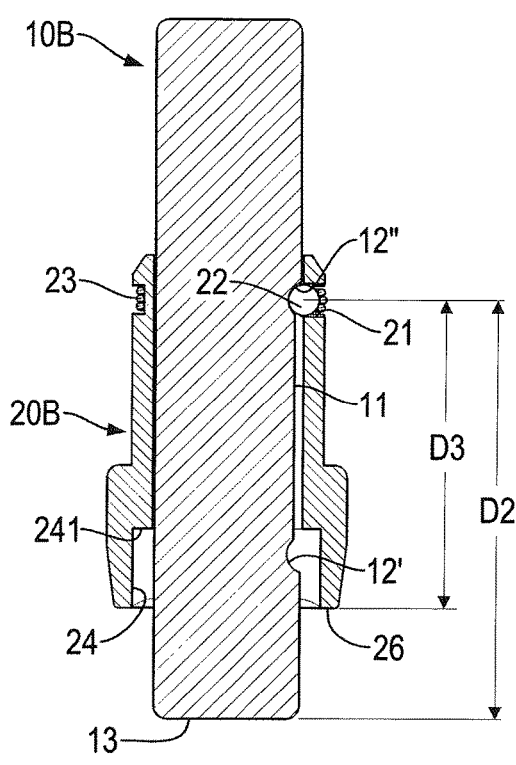
FIG. 8A is a side view in partial section of the polygonal wrench tool in FIG. 7.
Figure 8B:
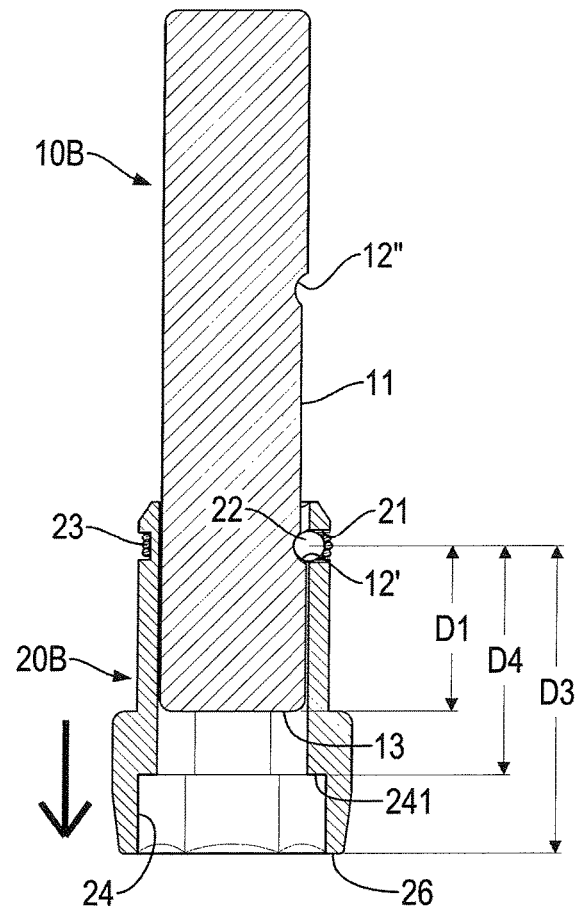
FIG. 8B is an operational side view in partial section of the polygonal wrench tool in FIG. 7.

With reference to FIGS. 7, 8A and 8B, a fourth preferred embodiment of a polygonal wrench tool in accordance with the present invention is similar with the first embodiment as shown in FIG. 1. The mounting tube 20B further has a mounting trough 24 and a fourth distance D4. The mounting trough 24 is annularly formed in the interior of the mounting tube 20B from the tube end 26, and has a step structure 241 opposite to the tube end 26. The fourth distance D4 is defined between the step structure 241 and the tube end 26. The fourth distance D4 is longer than the first distance D1 but is shorter than the third distance D3 and the second distance D2.

In use, when the positioning ball 22 is engaged in the second positioning trough 12" of the stick body 10B, the insertion end 13 protrudes out of the mounting tube 20B, as shown in FIG. 8A, and the stick body 10 can be applied in an Allen bolt. When the positioning ball 22 is engaged in the first positioning trough 12', the mounting tube 20B protrudes out of the insertion end 13, as shown in FIG. 8B, the mounting tube 20B can be applied around two hex bolts of different sizes, and a larger hex bolt can be mounted in the mounting trough 24.

Figure 9:
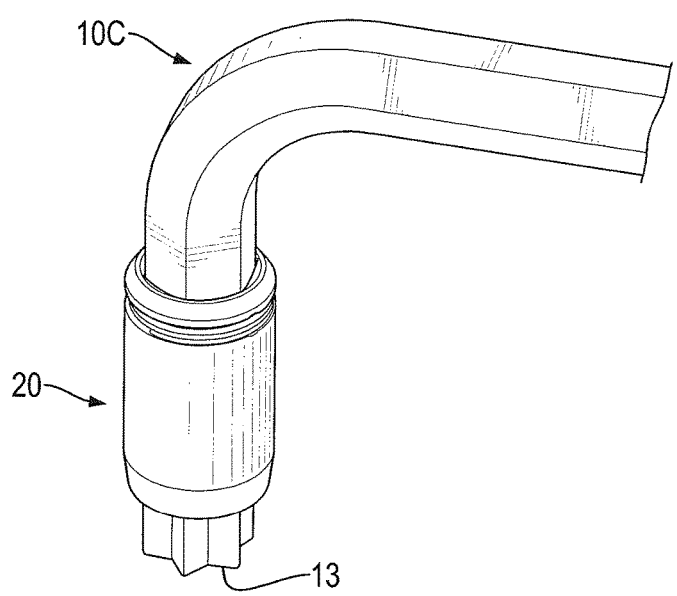
FIG. 9 is a perspective view of a fifth preferred embodiment of a polygonal wrench tool in accordance with the present invention.
Figure 10:
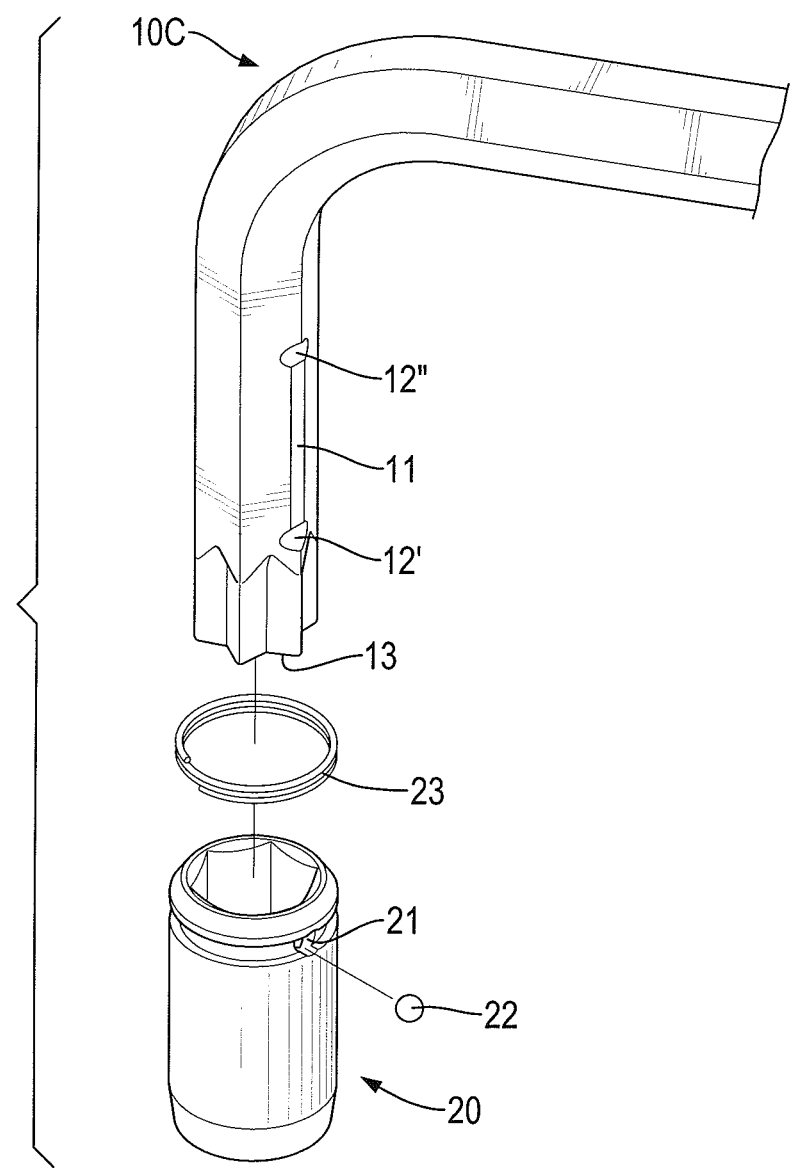
FIG. 10 is an exploded perspective view of the polygonal wrench tool in FIG. 9.
Figure 11:
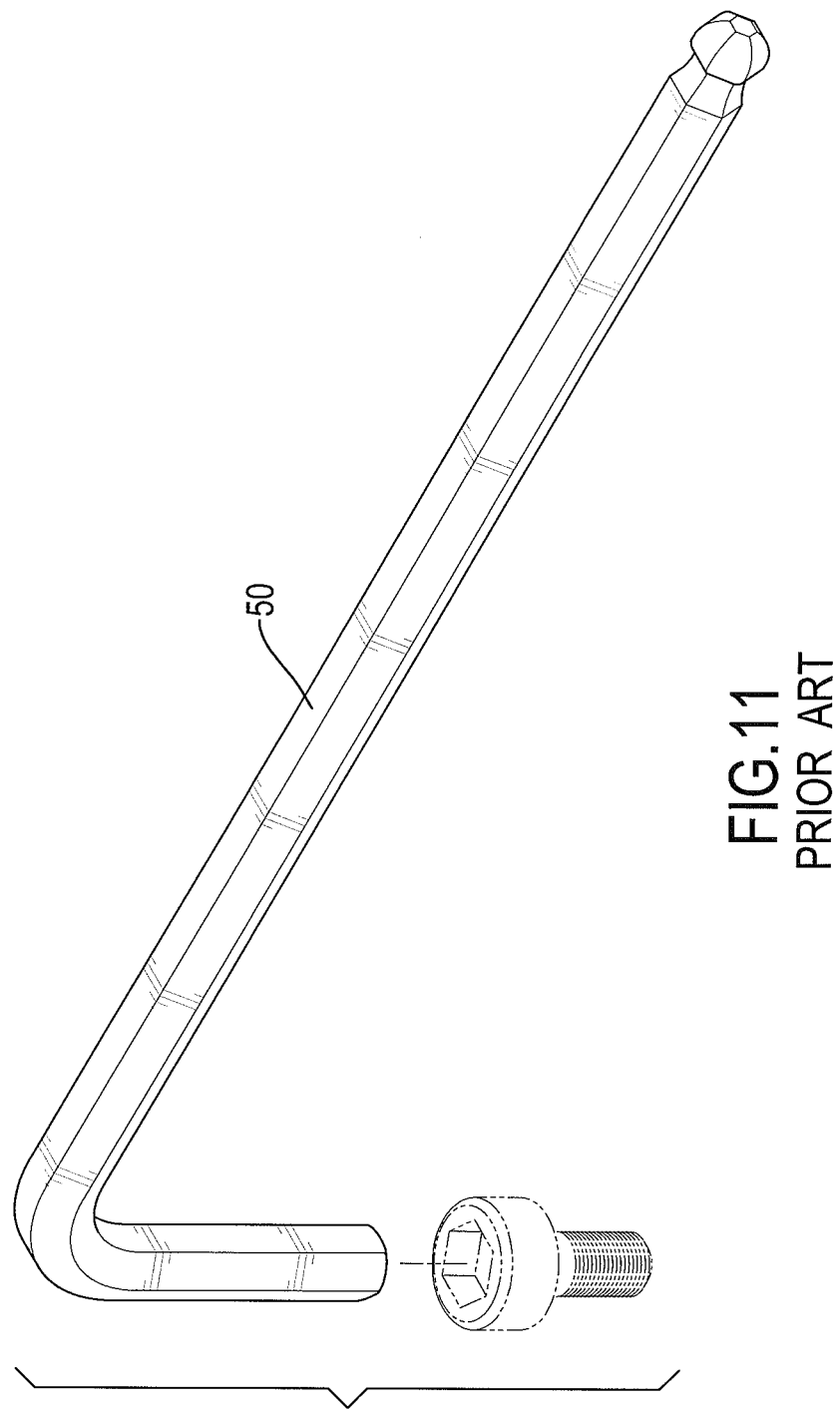
FIG. 11 is an operational perspective view of a conventional Allen wrench.
Figure 12:
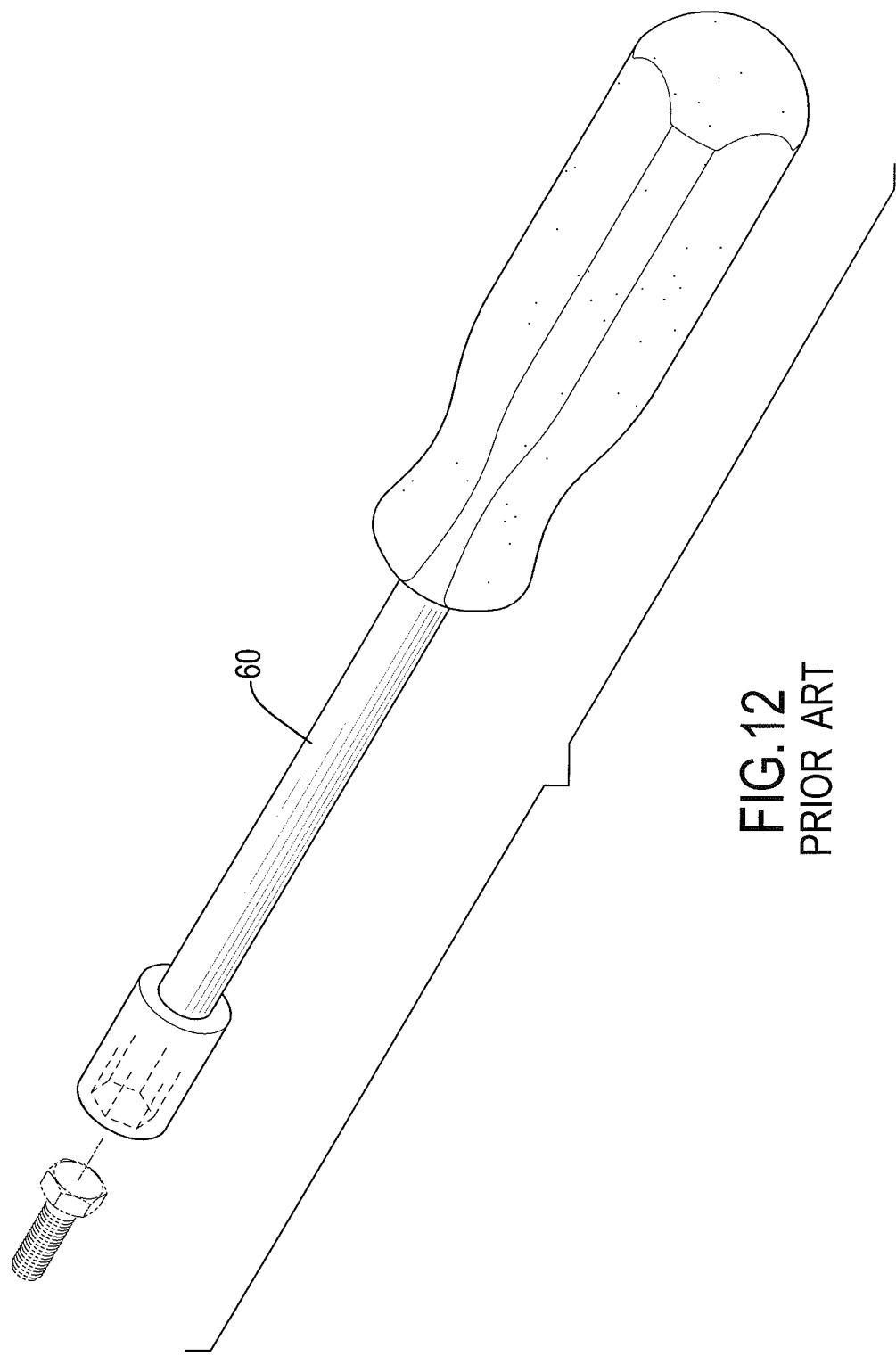
FIG. 12 is an operational perspective view of a conventional sleeve hex-wrench.

With reference to FIGS. 9 and 10, a fifth preferred embodiment of a polygonal wrench in accordance with the present invention is similar with the third embodiment as shown in FIG. 6. The cross section of the stick body 10C at the insertion end 13 is stellate. The engagement portion 14 is formed in one of the edges along the longitudinal direction of the stick body 10C. When the positioning ball 22 is engaged in the second positioning trough 12", the stick body 10C protrudes out of the mounting tube 20 and can be applied in an inner torx-bolt. When the positioning ball 22 is engaged in the first positioning trough 12', the mounting tube 20 protrudes out of the stick body 10C and can be applied around an outer torx-bolt.

From the above description, it is noted that the present invention has the following advantages:

1. By adjusting the position of the positioning ball 22 engaged in the engagement portion 14, the wrench tool can be determined as applicable on an Allen bolt or a hex bolt, such that the wrench tool has two operating states even though without being a sleeve hex-wrench. The manufacturing process of the engagement portion 14 in the stick body 10 is simple, such that the polygonal wrench tool has a lowered manufacturing cost.

2. When the stick body 10 protrudes out of the mounting tube 20, the stick body 10 can be applied in an inner polygonal bolt. When the mounting tube 20 protrudes out of the stick body 10, the mounting tube 20 can be applied around an outer polygonal bolt. The spring 23 presses the positioning ball 22 to be engaged in the engagement portion 14 to keep the mounting tube 20 from detaching from the stick body 10. Therefore, it is convenient for the user to assembly and use the polygonal wrench tool.

3. The mounting tube 20 may further have a mounting trough 24, so when the mounting tube 20 protrudes out of the stick body 10, the mounting tube 20 can be applied around two bolts of different sizes.

4. The cross section of the stick body 10 may be hexagonal or stellate to meet different usage demands.

Even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A polygonal wrench tool having:
   a stick body being polygonal in cross-section forming multiple edges extending along the longitudinal direction, wherein the stick body has:
      an insertion end;
      an engagement portion formed in one of the multiple edges along the longitudinal direction of the stick body and having:
         an engagement slit having a slit depth from the one of the multiple edges of the stick body and extending along the longitudinal direction of the stick body;
         a first positioning trough having a first trough depth from the one of the multiple edges of the stick body and communicating with the engagement slit; and
         a second positioning trough having a second trough depth from the one of the multiple edges of the stick body and communicating with the engagement slit, with the first and second trough depth being deeper from the one of the multiple edges of the stick body than the slit depth;

a first distance defined between a center of the first positioning trough and the insertion end; and a second distance defined between a center of the second positioning trough and the insertion end;

a mounting tube being hollow, slidably mounted around the stick body and having:

a tube end selectively protruding beyond the insertion end;

a ball hole formed through the mounting tube and communicating with an interior of the mounting tube; and a third distance defined between a center of the ball hole and the tube end, wherein the third distance is larger than the first distance and is shorter than the second distance;

a positioning ball accommodated in the ball hole and abutting the engagement portion; and a spring mounted around the mounting tube and pressing the positioning ball, wherein the insertion end protrudes out of the mounting tube with the positioning ball engaged in the second positioning trough and with the first positioning trough intermediate the tube end and the second positioning trough, and wherein the mounting tube protrudes beyond the insertion end with the positioning ball engaged in the first positioning trough and with the first positioning trough intermediate the tube end and the second positioning trough.

2. The polygonal wrench tool as claimed in claim 1, wherein the mounting tube further has:

a mounting trough annularly concaved in the interior of the mounting tube from the tube end, and having a step structure opposite to the tube end; and a fourth distance defined between the step structure and the tube end, wherein the fourth distance is larger than the first distance but is shorter than the third distance and the second distance.

3. The polygonal wrench tool as claimed in claim 1, wherein a cross section of the stick body is hexagonal.

4. The polygonal wrench tool as claimed in claim 2, wherein a cross section of the stick body is hexagonal.

5. The polygonal wrench tool as claimed in claim 1, wherein a cross section of the stick body is hexagonal, and the stick body is elongated and L-shaped.

6. The polygonal wrench tool as claimed in claim 1 further having a holding handle connected with the stick body, wherein the holding handle has:

a handle body being elongated; and an adapter tube connected between the handle body and an end of the stick body opposite to the insertion end.

7. The polygonal wrench tool as claimed in claim 6, wherein a cross section of the stick body is hexagonal.

8. The polygonal wrench tool as claimed in claim 1, wherein the insertion end has a stellate cross section, and the stick body is elongated and L-shaped.

* * * * *